United States Patent Office.

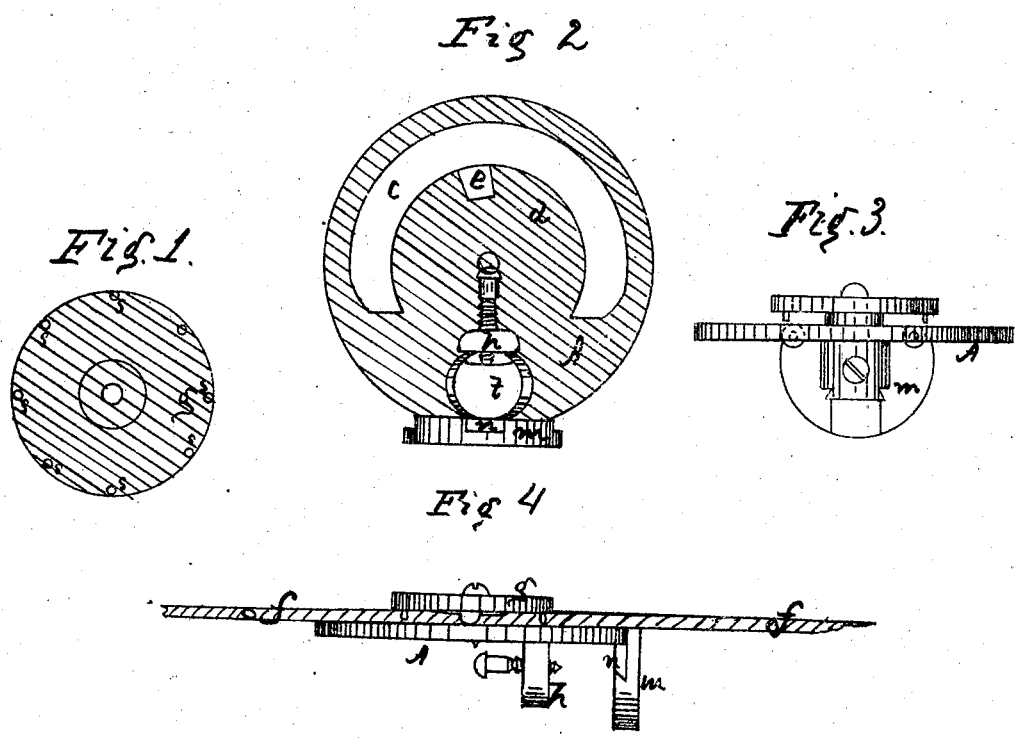

WALTER B. NOYES, OF DORCHESTER, NEW HAMPSHIRE.

Letters Patent No. 74,715, dated February 18, 1868.

IMPROVED CLOTHES-DRIER.

The Schedule referred to in these Letters Patent and making part of the same.

TO ALL WHOM IT MAY CONCERN:

Be it known that I, WALTER B. NOYES, of Dorchester, in the county of Grafton, and State of New Hampshire, have invented certain new and useful Improvements in Clothes-Drier; and I do hereby declare that the following is a full, clear, and exact description thereof, reference being had to the accompanying drawings, and to the letters of reference marked thereon, which form a part of this specification, in which—

Figure 1 is a plan view of the revolving wheel.

Figure 2 represents an elevation of my drier when viewed on the upper side, and placed in a vertical position.

Figure 3 is a plan view of the same when the wheel is in a vertical position.

Figure 4 is a side view, with the arms attached.

My invention consists of the wheel A, having in it the circular slot $c$. On the inner side of the slot $c$ is the semicircular projection $d$, with an opening, $e$, through which the ends of arms $f$ can pass to the wheel $g$, which is pivoted to projection $d$, and has on its under surface the pin $s$, the office of which will be hereinafter explained. $h$ and $n$ represent two projections, near the rear side of wheel A. Projection $h$ has a screw passing through it, the object of which will be hereinafter seen. $m$ represents an adjustable slide, with a groove in it, for the purpose of receiving the projection $n$. The slide $m$ has several perforations in it, through which are admitted the screws to fasten the drier to the wash-stand or table. As there is an opening, $t$, in the rear of projection $n$, any fixture sufficiently small to pass through said opening will serve to sustain the drier, by means of the screw in $h$.

When the drier is secured in position, the mode of operating it is simply to move the wheel $g$, until one of the pins $s$ comes to the centre of opening $e$, then insert an arm, $f$, which has a hole in it to fit the said pin. The first arm being thus secured, turn the wheel $g$ until the next pin is reached, and so on, until the whole of the arms are in position. The arms, when thus inserted, will be supported by that portion of the rim of wheel A which is outside of slot $c$.

Having thus described my invention, what I claim as new, and desire to secure by Letters Patent, is—

1. The wheel A, furnished with slot $c$ and opening $e$, in the manner and for the purpose substantially as set forth.

2. The wheel A, in combination with wheel $g$, when constructed and arranged substantially as described.

3. The wheels A and $g$, and arms $ff$, in combination with slide $m$, the whole constructed and operating as described.

In testimony that I claim the foregoing as my own, I affix my signature in presence of two witnesses.

WALTER B. NOYES.

Witnesses:
S. N. BELL,
HENRY E. BURNHAM.